US005727164A

United States Patent [19]
Kaye et al.

[11] Patent Number: 5,727,164
[45] Date of Patent: Mar. 10, 1998

[54] APPARATUS FOR AND METHOD OF MANAGING THE AVAILABILITY OF ITEMS

[75] Inventors: Eugene G. Kaye, St. James; Steve Song, East Setauket; Joe Cabana, Centereach, all of N.Y.

[73] Assignee: Max Software, Inc., Central Islip, N.Y.

[21] Appl. No.: 806,637

[22] Filed: Dec. 13, 1991

[51] Int. Cl.$^6$ .................................................. G06F 15/00
[52] U.S. Cl. ........................... 395/228; 395/229; 395/615
[58] Field of Search ................................ 364/401, 403, 364/408, 479; 235/385; 395/600, 200, 650, 201, 228, 229, 602, 603, 610, 615

[56] References Cited

U.S. PATENT DOCUMENTS

| | | |
|---|---|---|
| 3,771,137 | 11/1973 | Barner et al. |
| 3,889,237 | 6/1975 | Alferness et al. |
| 4,073,005 | 2/1978 | Parkin. |
| 4,558,211 | 12/1985 | Berstein ............... 235/380 |
| 4,600,988 | 7/1986 | Tendulkar et al. ....... 364/200 |
| 4,642,758 | 2/1987 | Teng ...................... 395/610 |
| 4,674,055 | 6/1987 | Ogaki et al. ............. 364/479 |
| 4,692,862 | 9/1987 | Cousin et al. ........... 364/200 |
| 4,734,858 | 3/1988 | Schalafly ................ 364/408 |
| 4,774,655 | 9/1988 | Kollin et al. |
| 4,787,050 | 11/1988 | Suzuki .................... 364/479 |
| 4,799,156 | 1/1989 | Shavit et al. ............ 364/401 |
| 4,872,541 | 10/1989 | Hayashi .................. 364/479 |
| 4,887,077 | 12/1989 | Irhy, III et al. ......... 340/825.47 |
| 4,887,208 | 12/1989 | Schneider et al. ...... 364/403 |
| 4,941,084 | 7/1990 | Terada et al. .......... 364/200 |
| 4,964,638 | 10/1990 | Ishida .................... 364/412 |
| 4,984,155 | 1/1991 | Geier et al. ............ 364/401 |
| 4,992,940 | 2/1991 | Dworkin ................. 364/401 |
| 5,027,283 | 6/1991 | Phillips et al. ......... 364/479 |
| 5,038,374 | 8/1991 | Kaufman et al. ....... 379/98 |
| 5,065,343 | 11/1991 | Inoue ..................... 395/162 |
| 5,077,694 | 12/1991 | Sansone et al. ....... 395/600 |
| 5,117,354 | 5/1992 | Long et al. ............ 364/401 |
| 5,220,657 | 6/1993 | Bly et al. .............. 395/425 |
| 5,222,242 | 6/1993 | Choi et al. ............ 395/800 |
| 5,267,171 | 11/1993 | Suzuki et al. ......... 364/479 |
| 5,307,496 | 4/1994 | Ichinose et al. ...... 395/650 |
| 5,490,251 | 2/1996 | Clark et al. .......... 395/200.2 |

OTHER PUBLICATIONS

Everest, *Database Management*, copyright 1986, chapter 18, pp. 732–781, especially p. 746.

*Primary Examiner*—Gail O. Hayes
*Assistant Examiner*—Stephen R. Tkacs
*Attorney, Agent, or Firm*—Fitzpatrick, Cella, Harper & Scinto

[57] ABSTRACT

Apparatus and method for managing the availability of items using a computer system. The system permits various computers to access databases located at offsite computers to retrieve/transmit preselected information pertaining to the availability of items from/to each accessed database. Categories of items are selected by a user prior to communicating with offsite computers so that only the categories of interest are selected and only data pertaining to those categories is downloaded to the requesting computer or uploaded from a called computer. Once data has been retrieved by the requesting computer, the user can use various parameters to select and display the received information in the selected categories. In addition, the requesting computer can automatically retrieve information from offsite computers at a predetermined time each day of the week.

18 Claims, 26 Drawing Sheets

```
                Vendor Form              Wed Nov 13 17:23

┌─────────────────────────┐
     │ Local Inventory Menu    │
     ├─────────┬───────────────────────┐
     │ Offsite │ Communication Setup   │
  ┌──┴─────────┴───────────────────────┴──────────────┐
  │ Name: TWIXT ELECTRONICS                            │
  │ Address: 1787-36 VETS HIGHWAY                      │
  │ City: CENTRAL ISLIP      State: NY  Zip: 11722     │
  │ Phone: 582-8080     FACS: 582-8180                 │
  │ Contact: GENE KAYE                                 │
  │ Modem#: 361-8729                                   │
  │ Sun: 2357  Mon: 0000  Tue: 0000  Wed: 0330         │
  │ Thu: 0000  Fri: 0530  Sat: 0000                    │
  └────────────────────────────────────────────────────┘

F1:Help         F4:Edit  F5:Quit  F6:Save        F10:DOS
```

| Family — Subfamily | |
|---|---|
| COMPUTER | —HARD DISKS |
| COMPUTER | —I\O DEVICES |
| COMPUTER | —MONITORS |
| COMPUTER | —PERIPHERALS PRINTERS |
| COMPUTER | —OTHER/MISCELLANEOUS |
| CONNECTORS | —CARD EDGE |
| CONNECTORS | —D SUB AND SUB MINIATURES |
| CONNECTORS | —FIBER OPTIC |
| CONNECTORS | —FLAT CABLE |
| CONNECTORS | —SOCKET |
| CONNECTORS | —OTHER/MISCELLANEOUS |
| CRYSTALS | —MICROPROCESSOR |
| CRYSTALS | —QUARTZ |
| CRYSTALS | —OTHER/MISCELLANEOUS |
| DELAY LINES | —AUDIO |
| DELAY LINES | —DIGITAL |
| DELAY LINES | —OTHER/MISCELLANEOUS |
| ˅DIGITAL | —CMOS 4XXX |

Add/Delete Family     TUE DEC 03 15:17

F1:Help  F2: Find     F4:Add  F5:Del     F10:DOS

FIG. 6

```
Item Form                    Mon Nov 18 10:16

┌─Local Inventory Menu─┐
    │                      │
    │  Family: Digital     │
    │          Date Code:  │
    │                      │
ID: │                      │
Man:│  Cost: 0.000  Qnty: 0│
    │                      │
    │      ┌────────┐      │
    │      │ Update │      │
    │      └────────┘      │
Comment:                   │
    └──────────────────────┘

F1:Help              F4:Edit  F5:Quit  F6:Save              F10:DOS
```

FIG. 10

Enter Search Criteria          Mon Nov 11  19:42

Item:
Manufacture:
Minimum Quantity:        0
Minimum Date Code:       0
Maximum Cost:        0.000

F1:Help        F4:Edit  F5:Quit  F6:Srch        F10:DOS

FIG. 12

| Item ID | Quantity | D/C | Man. | Cost | Family |
|---|---|---|---|---|---|

Item ID: 4002B         FAMILY: DIGITAL
Quantity On Hand: 20001  Cost: 0.060
Item Manufacture: GOLD  Date Code: 9000
Comment: 25pcs/TUBE; 1000pcs/BOX

| | | | | | |
|---|---|---|---|---|---|
| 4069UB | 112770 | 9000 | GOLD | 0.500 | DIGITAL |
| 4076B | 9639 | 9000 | GOLD | 0.110 | DIGITAL |
| 4086B | 1500 | 9000 | GOLD | 0.080 | DIGITAL |
| 4104B | 5835 | 9000 | GOLD | 0.250 | DIGITAL |
| 4528B | 527 | 9000 | GOLD | 0.160 | DIGITAL |
| 4539B | 8960 | 9000 | GOLD | 0.200 | DIGITAL |
| 4703B | 8700 | 9000 | GOLD | 1.500 | DIGITAL |
| 4720B | 15953 | 9000 | GOLD | 1.500 | DIGITAL |
| 4724B | 10000 | 9000 | GOLD | 0.500 | DIGITAL |

F1:Help                                            F10:DOS

FIG. 13

| Item ID | Enter New Data | | Mon Nov 11 19:43 | | |
|---------|----------|-----|------|------|--------|
| | Quantity | D/C | Man. | Cost | Family |
| 4006B | 15551 | 9000 | GOLD | 0.120 | DIGITAL |
| 4 | | | | 10 | DIGITAL |
| 4 | | | | 50 | DIGITAL |
| 4 | | | | 50 | DIGITAL |
| 4 | | | | 60 | DIGITAL |
| 4 | | | | 30 | DIGITAL |
| 4051B | 37647 | 9000 | GOLD | 0.140 | DIGITAL |
| 4052B | 35000 | 9000 | GOLD | 0.140 | DIGITAL |
| 4069UB | 112770 | 9000 | GOLD | 0.065 | DIGITAL |
| 4076B | 9639 | 9000 | GOLD | 0.110 | DIGITAL |
| 4086B | 1500 | 9000 | GOLD | 0.080 | DIGITAL |
| 4104B | 5835 | 9000 | GOLD | 0.250 | DIGITAL |
| 4528B | 527 | 9000 | GOLD | 0.160 | DIGITAL |
| 4539B | 8960 | 9000 | GOLD | 0.200 | DIGITAL |
| 4703B | 8700 | 9000 | GOLD | 1.500 | DIGITAL |
| 4720B | 15953 | 9000 | GOLD | 1.500 | DIGITAL |
| 4724B | 10000 | 9000 | GOLD | 0.500 | DIGITAL |
| 4725B | 16727 | 9000 | GOLD | 1.500 | DIGITAL |

Quantity for Item: 4006B    Price: 0.120

Quantity: 155551

F1: HELP                    F10: DOS

FIG. 14

| Item ID | Quantity | D/C | Man. | Cost | Family | User |
|---|---|---|---|---|---|---|
| | | | | Search Results | | Mon Nov 11 19:43 |
| 4002B | 30000 | 9000 | GLD | 1.000 | DIGITAL | STEVE |
| 4002B | 44441 | 90 | GLD | 0.180 | DIGITAL | TWIXT ELECTRON |
| 4066BD | 45000 | 90 | GLD | 0.990 | DIGITAL | SI-FAn INT |
| 4076B | 77777 | 90 | GOLD | 0.022 | DIGITAL | TWIXT ELECTRON |
| 4085B | 79000 | 90 | GOLD | 0.080 | DIGITAL | SI-FAn INT |
| 4086B | 100000 | 90 | GOLD | 0.250 | DIGITAL | STEVE |
| GD4019B | 23300 | 9000 | GOLD | 1.000 | DIGITAL | LINDA COMPUTER |
| GD4019B | 23300 | 9000 | GOLD | 0.110 | DIGITAL | OSCAR ELECTRON |
| GD4019B | 23300 | 9000 | GOLD | 0.110 | DIGITAL | SI-FAn INT |
| GD74HC21 | 32145 | 9000 | GOLD | 23.000 | DIGITAL | OSCAR ELECTRON |
| GD74HC533 | 25000 | 90 | GOLD | 0.200 | DIGITAL | LINDA COMPUTER |
| GD74HC648 | 30000 | 9000 | GOLD | 0.500 | DIGITAL | LINDA COMPUTER |
| 74HCT10 | 20496 | 90 | GLD | 0.060 | DIGITAL | OSCAR ELECTRON |
| 74HCT10 | 20496 | 90 | GLD | 0.060 | DIGITAL | SI-FAn INT |
| 74HCT10 | 20496 | 90 | GLD | 0.060 | DIGITAL | STEVE |
| 74HCT10 | 20499 | 90 | GLD | 0.060 | DIGITAL | TWIXT ELECTRON |
| 74HCT20 | 20000 | 90 | GOLD | 0.060 | DIGITAL | OSCAR ELECTRON |
| 74HCT20 | 20000 | 90 | GOLD | 0.060 | DIGITAL | SI-FAn INT |

F1: Help  F2: Find  F10: DOS

FIG. 17A

Mon Nov 11 19:49

Search Results

| Item ID | Quantity | D/C | Man. | Cost | Family | User | |
|---|---|---|---|---|---|---|---|
| 74LS257A | 21000 | 90 | GOLD | 0.130 | DIGITAL | OSCAR | ELECTRON |
| 74S00 | 7777777 | | | 0.000 | DIGITAL | OSCAR | ELECTRON |
| MC1458 | 7159 | 91 | TI | 1.000 | INTERFACE | OSCAR | ELECTRON |
| MC1489AN | 16000 | 90 | SIG | 0.105 | INTERFACE | OSCAR | ELECTRON |
| ULN2003AN | 80000 | 90 | TI | 0.155 | INTERFACE | OSCAR | ELECTRON |
| MC1458 | 7159 | 91 | TI | 1.000 | INTERFACE | OSCAR | ELECTRON |
| MC1489AN | 16000 | 90 | SIG | 1.105 | INTERFACE | OSCAR | ELECTRON |
| ULN2003AN | 80000 | 90 | TI | 0.155 | INTERFACE | OSCAR | ELECTRON |
| LM285H-1.2 | 99999999 | 89 | NSC | 0.000 | LINEAR | OSCAR | ELECTRON |
| ST27256-25CP | 10000000 | 89 | SGS | 0.015 | MEMORY | OSCAR | ELECTRON |
| TMS4464-10NL | 26295 | 90 | TI | 1.450 | MEMORY | OSCAR | ELECTRON |
| 9423DC | 183 | 84 | FSC | 5.000 | MEMORY | OSCAR | ELECTRON |
| CNY17-1Z | 998 | 87 | QTH | 0.200 | OPTO | OSCAR | ELECTRON |
| 4066BD | 45000 | 90 | GLD | 0.990 | DIGITAL | SI-FAn | INT |
| 4085B | 79000 | 90 | GOLD | 0.080 | DIGITAL | SI-FAn | INT |
| 74HCT173 | 22400 | 90 | GOLD | 0.110 | DIGITAL | SI-FAn | INT |
| GD4019B | 23300 | 9000 | GOLD | 0.110 | DIGITAL | SI-FAn | INT |
| 74HCT10 | 20496 | 90 | GLD | 0.060 | DIGITAL | SI-FAn | INT |

F1: Help   F2: Find   F10: DOS

FIG. 17B

```
                                    Wed Nov 13  17:23
   Vendor Form

┌─Local Inventory Menu─┐
        │ Offsite Communication Setup │
        │                              │
        │ Name: TWIXT ELECTRONICS              │
        │ Address: 1787-36 VETS HIGHWAY        │
        │ City: CENTRAL ISLIP    State: NY  Zip: 11722 │
        │ Phone: 582-8080        FACS: 582-8180 │
        │ Contact: GENE KAYE                   │
        │ Modem#: 361-8729                     │
        │ Sun: 2357  Mon: 0000  Tue: 0000  Wed: 0330 │
        │ Thu: 0000  Fri: 0530  Sat: 0000      │
        └──────────────────────────────────────┘

F1:Help            F4:Edit F5:Quit F6:Save        F10:DOS
```

FIG. 22

Sunday

| | |
|---|---|
| SI-FAN INT – 0030 | BUTTERWORTH COMPONENTS – 1930 |
| OSCAR ELECTRONICS – 0215 | DEFINITION INC. – 1945 |
| STEVE – 0255 | DRAGO ELECTRONICS – 2000 |
| MEGA MICRO – 0600 | GERONIMO SYSTEMS – 2015 |
| A-2-Z ELECTRONICS – 1900 | IRGUN COMPONENTS – 2030 |
| ABSOLUTE ELECTRONICS – 1915 | TWIXT ELECTRONICS – 2357 |

Monday

| | |
|---|---|
| ROGER SYSTEMS – 0505 | ZING ELECTRONICS – 2350 |
| SI-FAN INT – 1712 | LINDA COMPUTER – 2355 |
| KONG SYSTEMS – 2345 | OSCAR ELECTRONICS – 2356 |

Tuesday

| | |
|---|---|
| MEGA MICRO – 0005 | SI-FAN INT – 1440 |
| OSCAR ELECTRONICS – 0015 | VIBRANT INC. – 2015 |

Wedsday

| | |
|---|---|
| SI-FAN INT – 0205 | BUTTERWORTH COMPONENTS – 2230 |
| STEVE – 0229 | DEFINITION INC. – 2245 |
| TWIXT ELECTRONICS – 0330 | DRAGO ELECTRONICS – 2300 |
| SWELL COMPONENTS – 0402 | GERONIMO SYSTEMS – 2315 |
| A-2-Z ELECTRONICS – 2200 | IRGUN COMPONENTS – 2330 |
| ABSOLUTE ELECTRONICS – 2215 | LINDA COMPUTER – 2356 |

Thursday

| | |
|---|---|
| ZING ELECTRONICS – 0442 | KONG SYSTEMS – 2345 |
| ROGER SYSTEMS – 0518 | LINDA COMPUTER – 2355 |
| SI-FAN INT – 1145 | OSCAR ELECTRONICS – 2359 |

Friday

| | |
|---|---|
| VIBRANT INC. – 0002 | OSCAR ELECTRONICS – 0310 |
| STEVE – 0003 | TWIXT ELECTRONICS – 0530 |
| MEGA MICRO – 0300 | SI-FAN INT. – 1558 |

Saturday

| | |
|---|---|
| OSCAR ELECTRONICS – 0215 | DRAGO ELECTRONICS – 1412 |
| SWELL COMPONENTS – 0500 | GERONIMO SYSTEMS – 1414 |
| A-2-Z ELECTRONICS – 0700 | IRGUN COMPONENTS – 1623 |
| ABSOLUTE ELECTRONICS – 0745 | KONG SYSTEMS – 1623 |
| BUTTERWORTH COMPONENTS – 1112 | LINDA COMPUTER – 2037 |
| DEFINITION INC. – 1345 | |

FIG. 23

```
Production: Nov 14 1991 00:50:12
    Version: Comm Module Version 1.02  13-Nov-1991
===Overnite started at Thu Nov 14 13:25:03 1991

Calling OSCAR ELECTRONICS [797-8124] @Thu Nov 14 13:25:15
Pausing...
CONNECT
called <OSCAR ELECTRONICS>; Thu Nov 14 13:25 == Thu Nov 14 13:26
Rcvd 0 files 0 records; Sent 1 FILES 21 records]
Hang-Up OK
  <SI-FAN-INT> called in; Thu Nov 14 13:27 == Thu  Nov 14 13:28
    Rcvd 0 files 0 records; Sent 1 files 21 records Hang-Up OK
calling TWIXT ELECTRONICS [361-8729] @Thu Nov 14 13:28:55
Pausing...
CONNECT
  called <TWIXT ELECTRONICS>; Thu Nov 14 13:28 == Thu Nov 14 13:30
    Rcvd 0 files 0 records; Sent 1 files 21 records Hang-Up OK
Unknown caller [SWELL COMPONENT]
<SWELL COMPONENT> unsuccessfully tried to login to (ROOSTER ELECTRONIC)
Hang-Up OK
Unknown caller [SWELL COMPONENT]
<SWELL COMPONENT> unsuccessfully tried to login to (ROOSTER ELECTRONIC)
Hang-Up OK
Hang-Up OK
MODEM CLOSED Overnite Scheduler Vender       Contact    Last Contact Time      Next Call Time
       SI-FAN INT        XD IN      Thu Nov 14 13:26
  OSCAR ELECTRONICS      XD OUT     Thu Nov 14 13:25
  TWIXT ELECTRONICS      XD OUT     Thu Nov 14 13:29
ABSOLUTE ELECTRONICS     OPEN       Thu Nov 14 11:29
     LINDA COMPUTER      OPEN       Wed Nov 13 15:09
              STEVE      OPEN       Thu Nov 14 00:57
   SWELL COMPONENTS      OPEN       Thu Nov 14 11:37
    ZING ELECTRONICS     OPEN       Thu Nov 14 12:00

=== Overnite stopped at Thu Nov 14 13:32:54===
```

FIG. 24

```
                                        13-Nov-1991    Thu Nov 14  11:06
            Comm Module Version 1.02    Stop Time: Fri Nov 15 06:33

22392832 bytes left name   modem              to call  status  last contact
  SI-FAN INT  582-8113        Thr 11:45  CALLOUT  Thu Nov 14 10:55
  KONG SYSTEMS 718-872-0948   Thr 23:45  CALLOUT
  LINDA COMPUTER 582-8682     Thr 23:55  CALLOUT  Wed Nov 13 15:09
  OSCAR ELECTRONI 797-8124    Thr 23:59  CALLOUT  Thu Nov 14 10:03
  VIBRANT INC. 818-482-6729   Fri  0:02  CALLOUT
  STEVE       331-7248        Fri  0:03  CALLOUT  Thu Nov 14 00:57
  MEGA MICRO  415-562-9563    Fri  3:00  CALLOUT
  TWIXT ELECTRONI 361-8729    Fri  5:30  CALLOUT  Thu Nov 14 06:20
  A-2-Z ELECTRONI 445-0923              OPEN
  ABSOLUTE ELECTR 818-345-9867          OPEN

AUTO-ANSWER MODE

Com 2 2400 MODEM (Node: ROOSTER ELECTRONIC)

OFFLINE  DSR CTS
F1:CALL
```

FIG. 25

APPARATUS FOR AND METHOD OF MANAGING THE AVAILABILITY OF ITEMS

BACKGROUND OF THE INVENTION

1. Field of the Invention

The present invention relates to an apparatus for and a method of managing the availability of items. More particularly, the present invention enables network users to access many various databases containing inventory information relating to a variety of items and retrieve information pertaining to selected family/subfamilies. Items of specific interest are selected by a user prior to communicating with many other databases so that only information pertaining to the items of interest are stored locally from each of the many offsite databases. Once the information has been retrieved by the user, the user can perform a local search of the retrieved information based on various selectable parameters and then display the results of the search. In addition, the present invention allows for automatic updating of the preselected items of interest so that the integrity of the locally stored various offsite inventories are accurately maintained.

2. Description of the Prior Art

Prior to the present invention systems capable of merely collecting information from databases were known. For example, U.S. Pat. No. 4,774,655 relates to a conventional system that enables a user to retrieve information from a plurality of remote databases using different language formats. The system includes a central processing unit connected to an incoming telecommunications line via a first modem and an outgoing telecommunications line via a second modem. The user accesses the system using a personal computer and a modem by calling the incoming telecommunications line. The system permits the calling user to specify an area of interest and then automatically selects a database to be searched in accordance with the area of interest specified by the user. The user then specifies a search request which is translated by the system into the language format for the appropriate database, and communicates with the database through the outgoing telecommunications line to download all information from the database corresponding to the search request presented by the user. The system then terminates the link with the database and permits the user to browse through the received information locally.

The present invention brings efficiencies to the marketplace by facilitating both the buying and selling of items through a very large current data base which is through this invention self sustaining. Efficiencies are achieved through rapid direct access to a large customer and vendor base, maximization of dollar return for the seller, and minimization of cost for the buyer. These goals are achieved by the present invention by bringing the many buyers and many sellers in closer contact. Also achieved is the minimization of time and cost needed to accomplish these product transactions.

Prior to the present invention, the sale of excess inventories were handled on a singular basis with middle man involvement and without direct access to a large customer base. This generally precluded receiving maximum return on each item and added time and inefficiencies to any sale transaction.

SUMMARY OF THE INVENTION

The foregoing problems have been solved in accordance with the present invention by providing a system and method for managing the availability of items held by users of a network. The system permits users to access inventory databases from many offsite locations in order to retrieve and offer the inventory of particular items that the buyers and sellers are interested in.

An object of the present invention is to solve the above problem by facilitating market accessibility for both the buyer and the seller by making both time spent and dollar return more efficient by providing rapid local retrieval of "complete" data on items and supplies from inventories being offered from many offsite users.

Another object of the present invention is to provide rapid and easy updating of the local inventory database thus facilitating the currency of items being offered, Another object of the present invention is to allow, at the discretion of the user, the system to be used only for buying or only for selling or for both buying and selling.

Another object of the present invention is the capability of local searching for items using various search criteria. This allows for more rapid search techniques.

Another object of the present invention is the capability of two-way transmission between network members, wherein both the receiver and caller transmit their pertinent requirements and inventories to each other, thus cutting overall communication costs.

Another object of the present invention is to offer control over the frequency of automatic inventory updating and to provide documentation confirming the updated inventory status.

Another object of the present invention is to provide local limits and screening on incoming data in regard to acceptable minimum quantities and cost extensions (price× quantity) in order to control superfluous inventory items not meeting pre-established inventory criteria.

Another object of the present invention is to provide preselectability of the many families/subfamilies available from the many offsite inventories of interest.

Another object of the present invention is that only family/subfamilies that have been updated since the last communication are transferred thus reducing communication costs.

Another object of the present invention is to permit unattended transmission and reception of data, permitting cost savings through the use of lowest rate telephone times and operator costs.

Another object of the present invention is that each user can limit access to their inventory database to selected network members.

Another object of the present invention is to provide reports and schedules so that communications can be easily programmed and accounted for.

Another object of the present invention is providing automatic start and stop times for modem operation. Start times being programmable up to 24 hours and stop times being programmable up to 7 days from the start time. This allows for integration of offsite inventory data into the local offsite inventory data prior to the start of a work day allowing for immediate availability to the current local offsite inventories. This also allows for modem operation during holiday and weekend periods.

Another object of the invention is that it permits only one communication link up between specific users per modem segment if there has been no change in either inventory thus preventing duplicity of transmissions.

Another object of the present invention is to offer a weekly schedule of all programmed calls allowing for ease of schedule control.

Another object of the present invention is to offer a comment section so that special information on each item is readily available.

These and other objects, aspects, features, and advantages of the present invention will become apparent from the following description taken in conjunction with the accompanying drawings.

BRIEF DESCRIPTION OF THE DRAWINGS

FIG. 6 is a master list of all available system family/subfamily selections;

FIG. 10 is an item form;

FIG. 12 is a display of a search criteria form;

FIG. 13 is a display showing the results of a search;

FIG. 14 is a display of the item update form;

FIGS. 17A and 17B show a comparison of the search by vendor and search by family search results;

FIG. 22 is a display of the vendor form;

FIG. 23 is a display of the call times list;

FIG. 24 is a display of transaction and schedule reports; and

FIG. 25 is a display of the run modem program form.

DETAILED DESCRIPTION OF INVENTION

The present invention provides for local on-site computer storage of both a local inventory and many other offsite network members' inventories. Each of the network members or users maintains their local inventory in the specified family/subfamily/item format on their respective computer. The uniformity of the format by all members of the network allows for universal data transferral between any and all members of the network.

Basically, each users system includes three integrated subsystems: local inventory, offsite inventory and communications.

Local inventory is where information on items available to other offsite network users is stored including family/subfamily, item type, manufacturer, date code, quantity, price, and comment information.

Offsite inventory is where inventories formatted (as in the above local inventory) are received from many offsite users and then stored for later retrieval by the local user.

Communication subsystem is provided for data transferral, modem control, frequency of data updating, interfacing with peripherals, automating communications and reports of data transferral and schedules of incoming and outgoing modem calls. The communication subsystem also provides for selectability of the network users who will have access to the local inventory.

The system permits the local users to search using their local computer the many stored offsite inventories for information pertaining to an item based on particular search criteria. The search criteria can be edited using any of the following descriptive parameters: item type, manufacturer, date code, quantity and price. Once an item has been identified as being available at another member's site the local member can then contact that vendor using the vendor information which is available with each line item of inventory stored.

The system therefore provides a simple and efficient method for the local user to identify offsite users having an item desired by the local user, without resorting to verbal communication and/or facsimiles in a blind attempt to locate another vendor who has the desired item.

Figure 1:
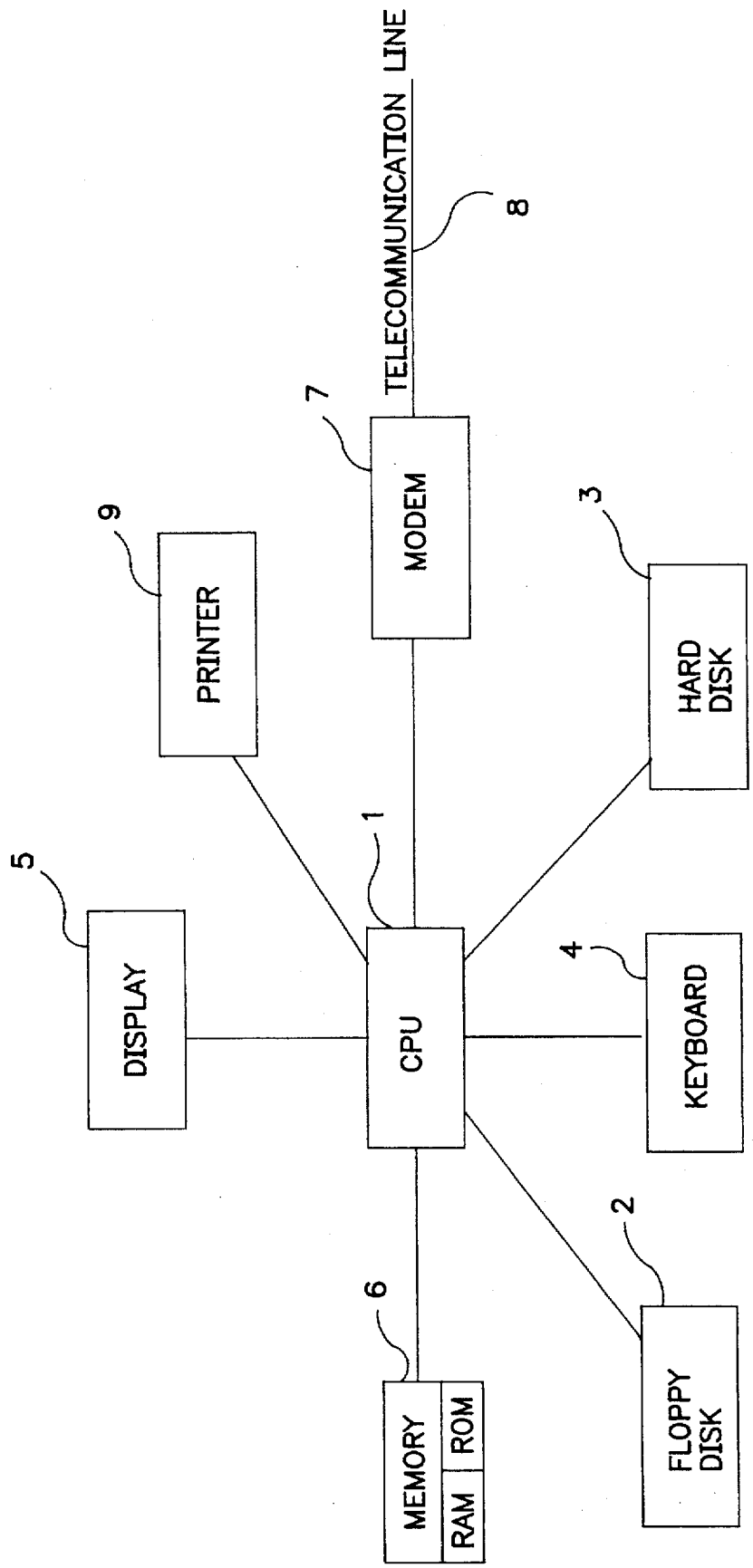
FIG. 1 is a block diagram illustrating a system employing the present invention.

FIG. 1 shows a block diagram of a system employing the present invention. The system includes a CPU 1, a floppy disk drive 2, a hard disk drive 3, a keyboard 4, a display 5 and a printer 9.

CPU 1 is connected to memory 6 which includes RAM and ROM. CPU 1 is also connected to modem 7 which provides the capability of performing data communication with other computers over telecommunication line 8. Any speed modem can be used in the present invention, however, the present system uses a 2400 Baud modem.

Figure 2:
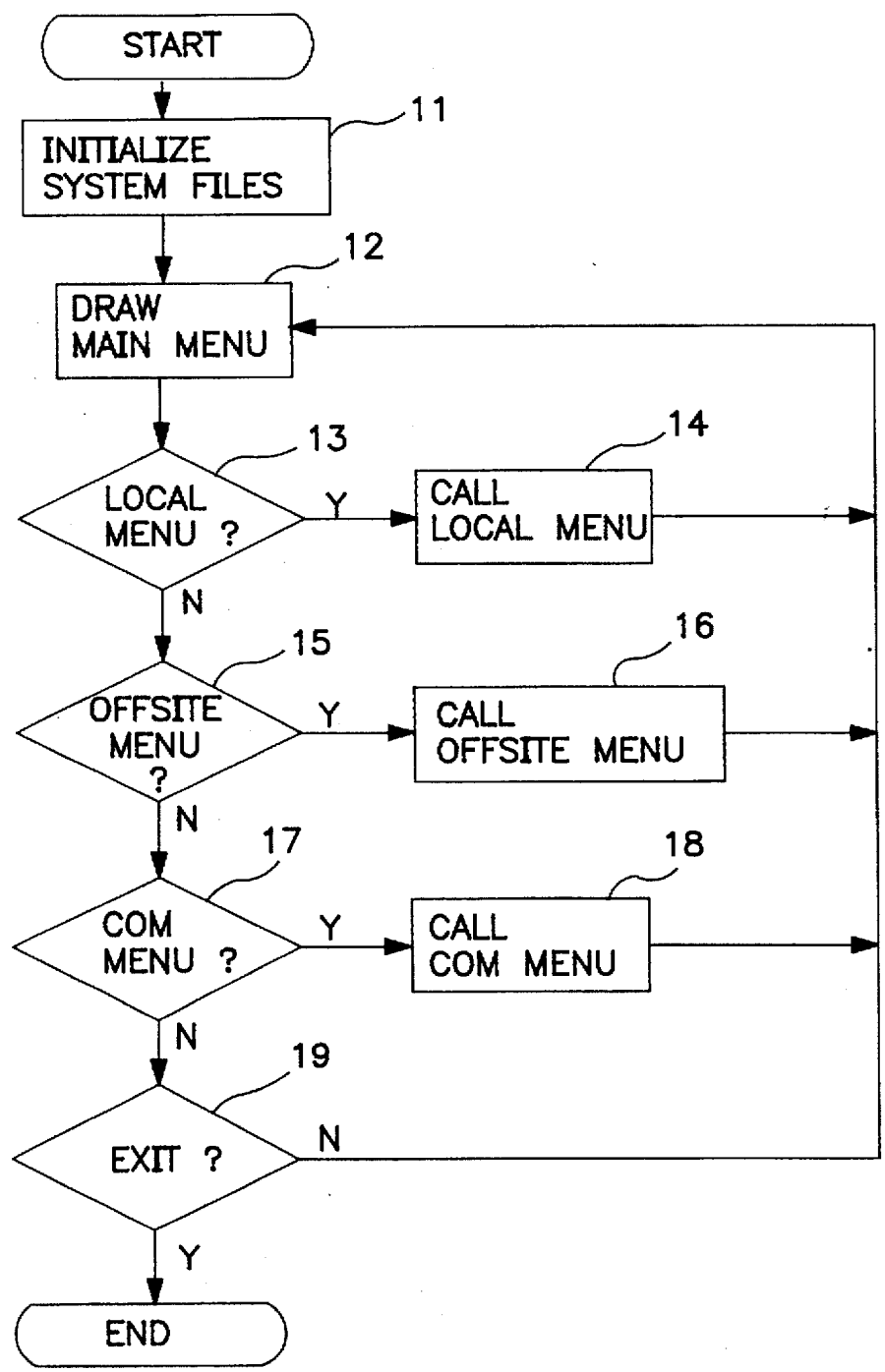
FIG. 2 is a flowchart of the main routine of a program which implements the present invention on the system.
Figure 3:
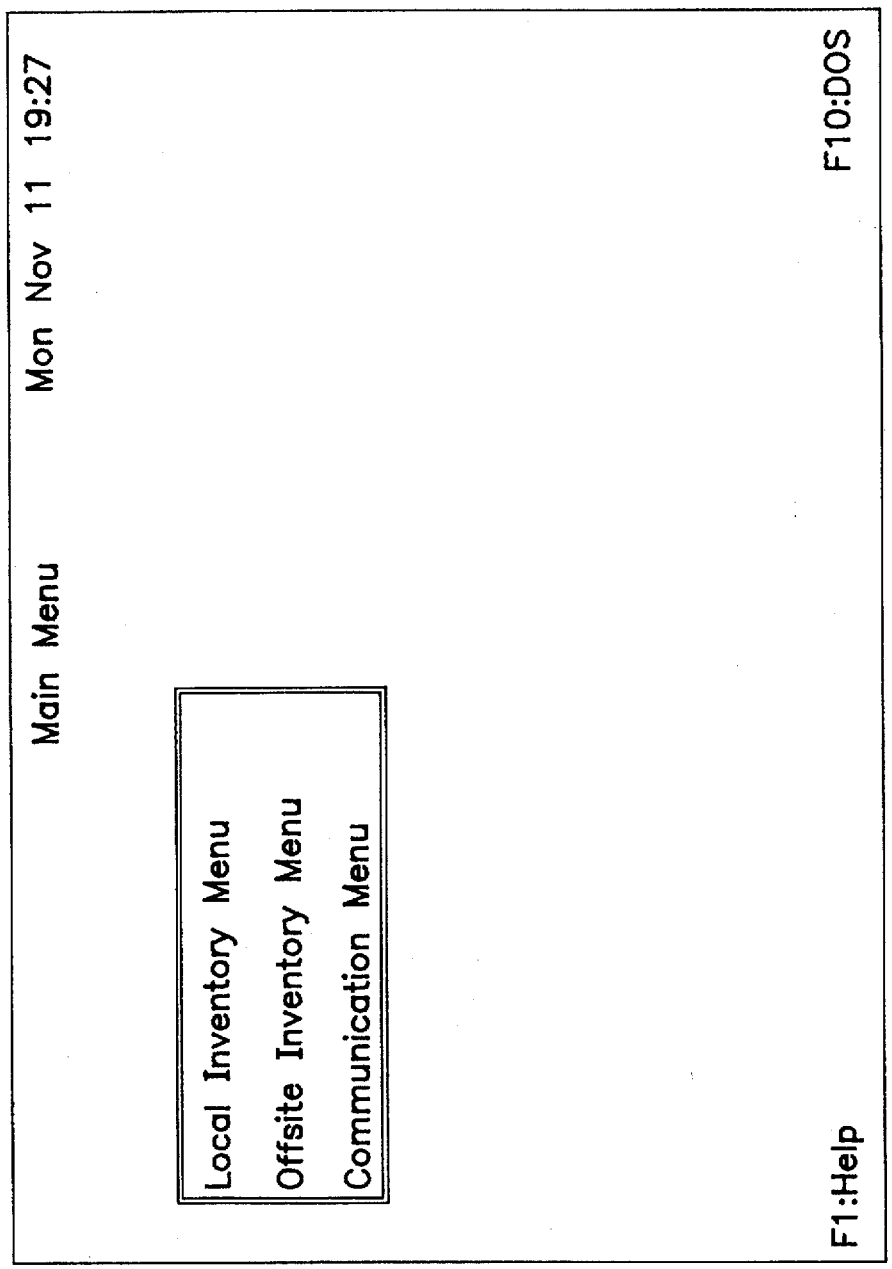
FIG. 3 is a display of the main menu.

FIG. 2 is a high level flow chart of an inventory program which implements the present invention on the system. The system first performs an initialization routine in step 11 during which system files are initialized and pointers in CPU 1 are set to address data stored in memory 6. In step 12 a main menu like that shown in FIG. 3 is displayed on display 5. The main menu is used by a local member or user on the system to select either a local inventory menu, an offsite inventory menu, or a communication menu. Selection is performed by using keyboard 4 to move a cursor so to point at the menu item to be selected and then pressing an enter key on keyboard 4.

Figure 4:
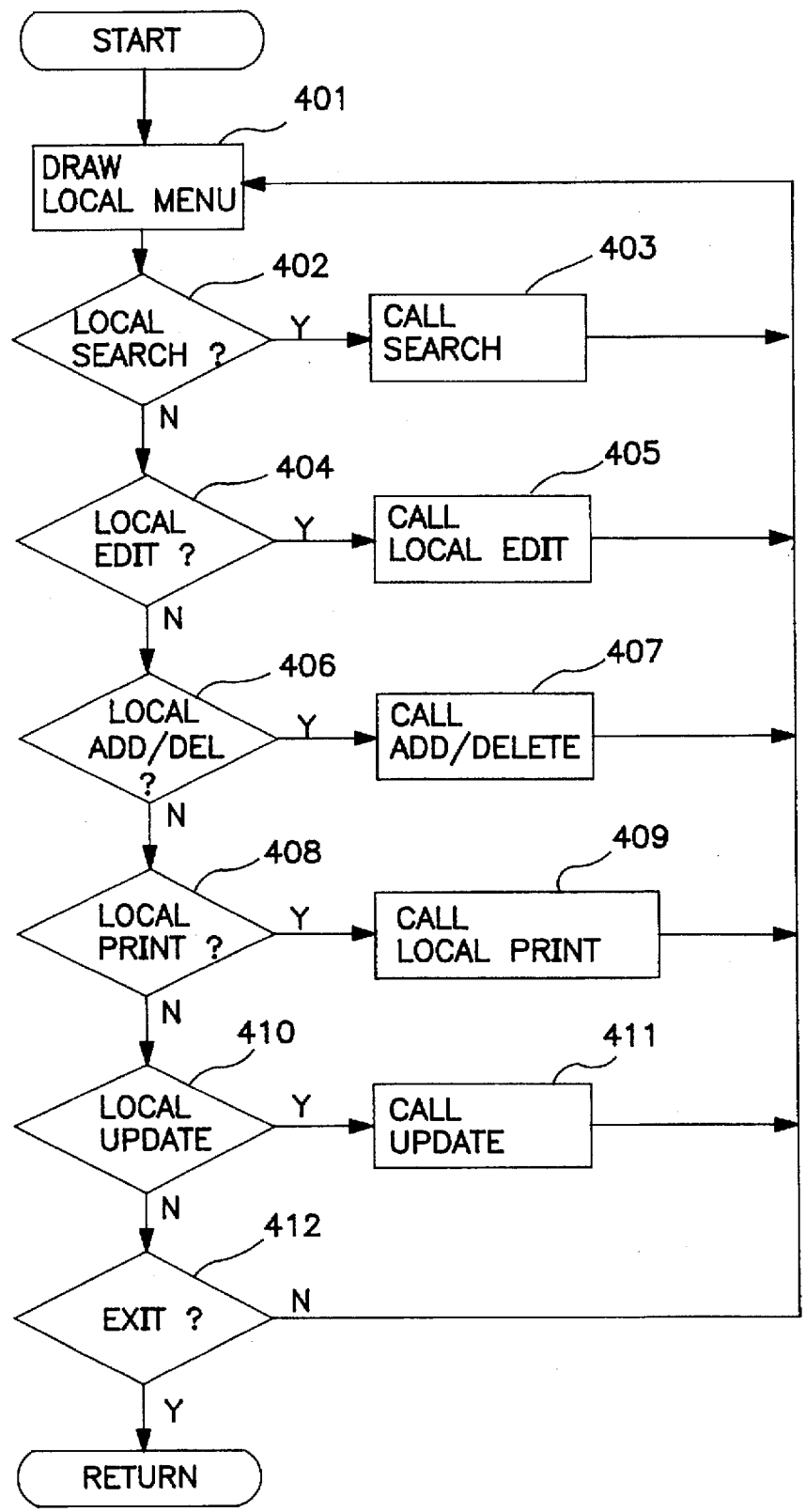
FIG. 4 is a flowchart of the local menu routine.
Figure 5:
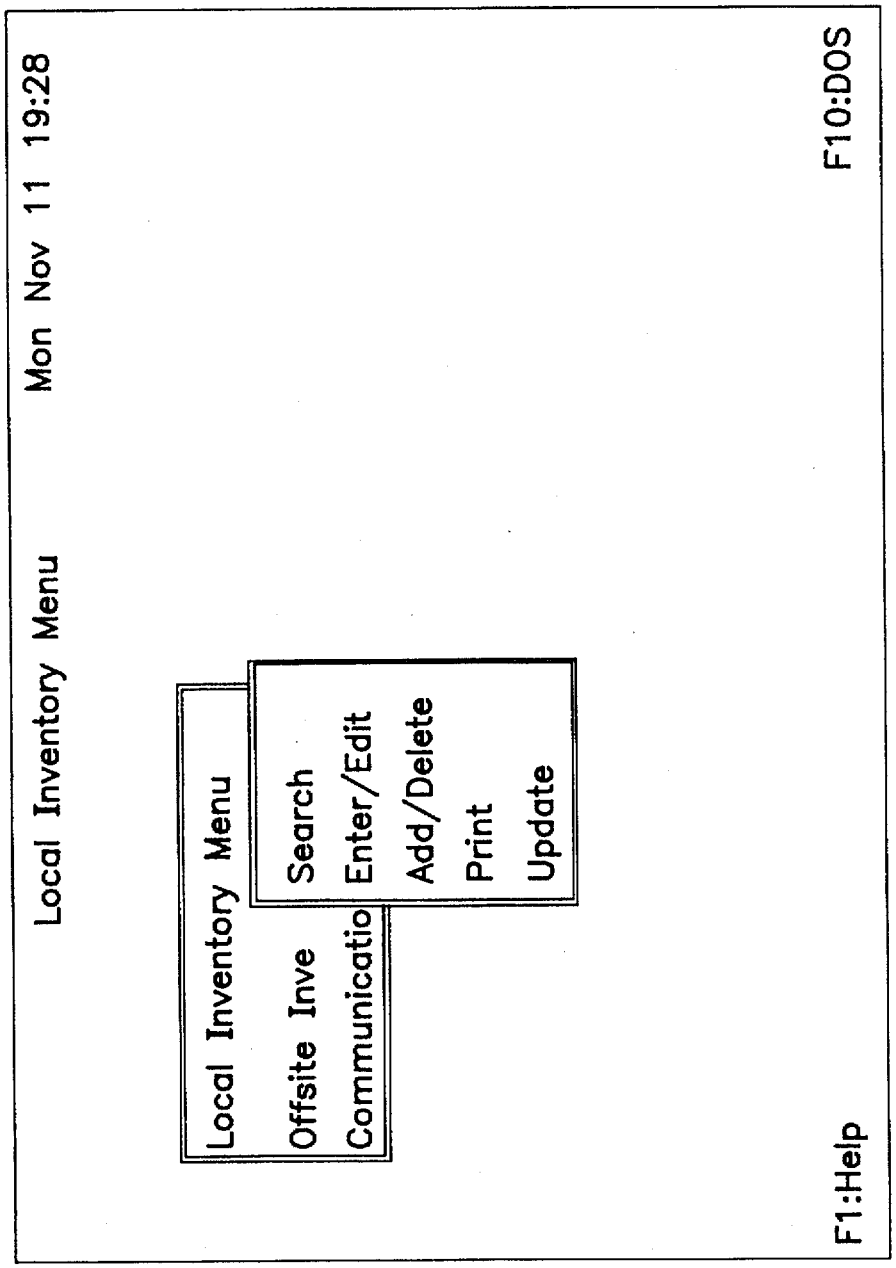
FIG. 5 is a display a local inventory menu.

The flowchart in FIG. 2 shows that if the local inventory menu entry is selected at step 13 from the main menu, a local menu routine is called by step 14 which displays a local inventory menu like that shown in FIG. 5. FIG. 4 is a flowchart of the local menu routine, in which step 401 draws the local inventory menu on display 5. The local inventory menu provides the user with the choice of searching, editing, adding/deleting, printing or updating the local inventory database.

If the add/delete entry is selected at step 406 in FIG. 5, step 407 calls an add/delete routine that provides the user with a complete list of all the family/subfamily names that are available on the network. This is the same list that is provided when the offsite inventory requirements are being established (discussed below). An example of such a master list is shown in FIG. 6, wherein a menu is displayed which permits the user to move the cursor to a desired family/subfamily name and select the family/subfamily by pressing an F4 key on the keyboard to add it to the local inventory database. When a family/subfamily name has been added to the local inventory database it is identified by a check mark in the left column. For example, see the check mark at DIGITAL CMOS 4XXX. The user can also delete a family/subfamily name from the local inventory database by striking the F5 key on the keyboard. The system will then remove the check mark and remove the family/subfamily and its data from the local inventory database.

The local user selects from the add/delete list those families/subfamilies that are relevant to the items he will be offering to all other users on the network.

Figure 7:
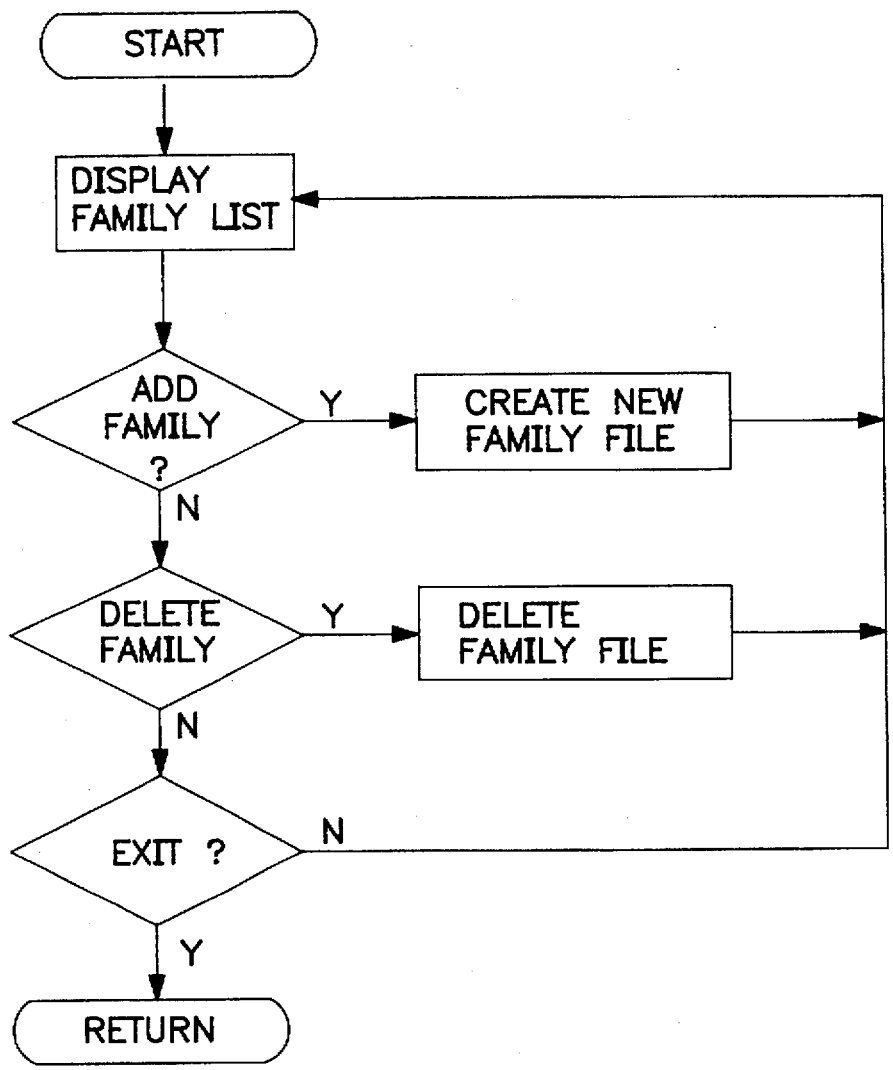
FIG. 7 is a flowchart for selecting family and subfamily entries for both local and/or offsite inventory databases.

FIG. 7 is a flowchart of the add/delete routine which is called in step 407. Once add/delete selections have been made the user selects the enter/edit routine to enter/edit any items and/or parameters of an item which is a member of the selected family/subfamily.

Figure 8:
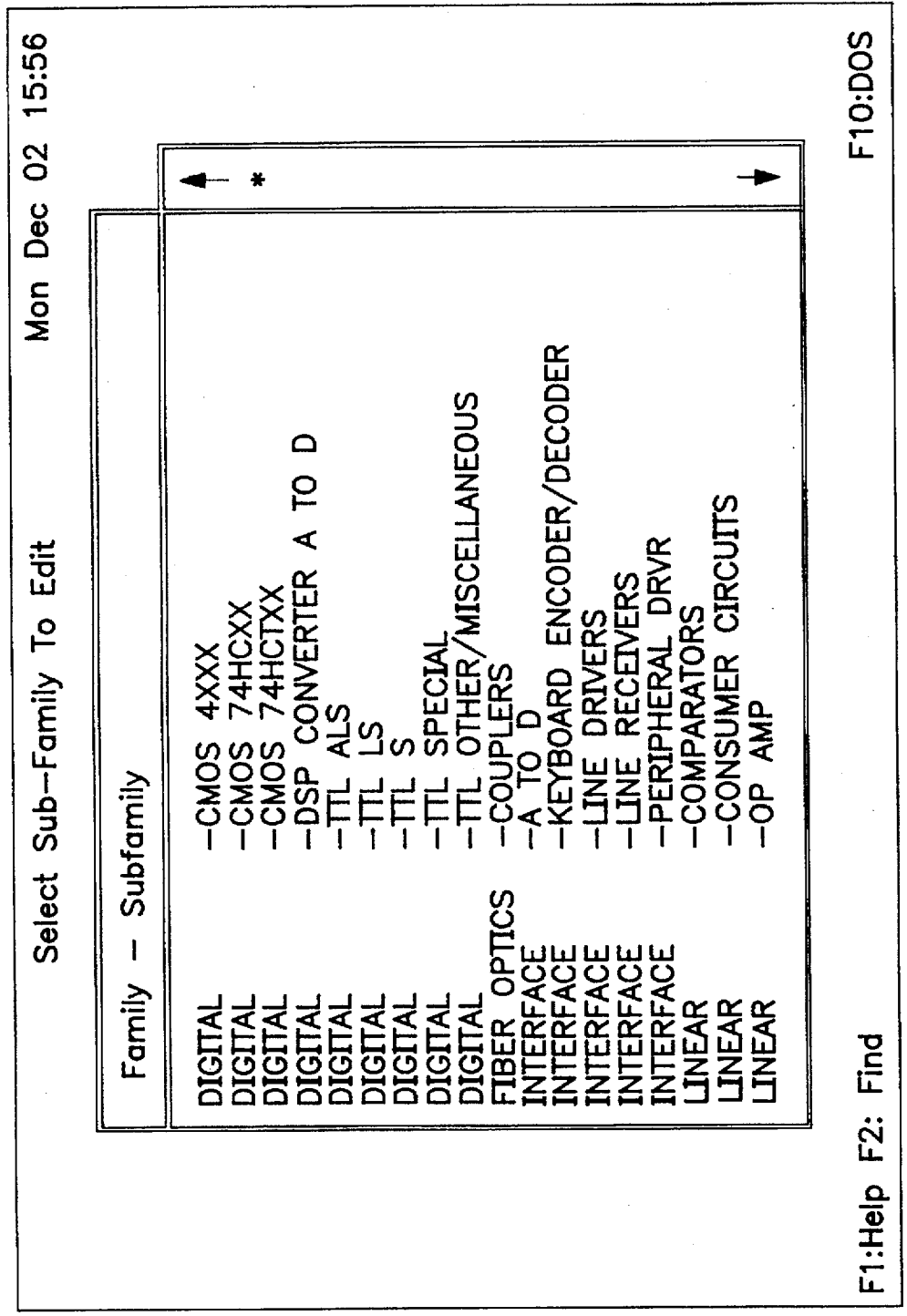
FIG. 8. is a display of local inventory family/subfamilies.
Figure 9:
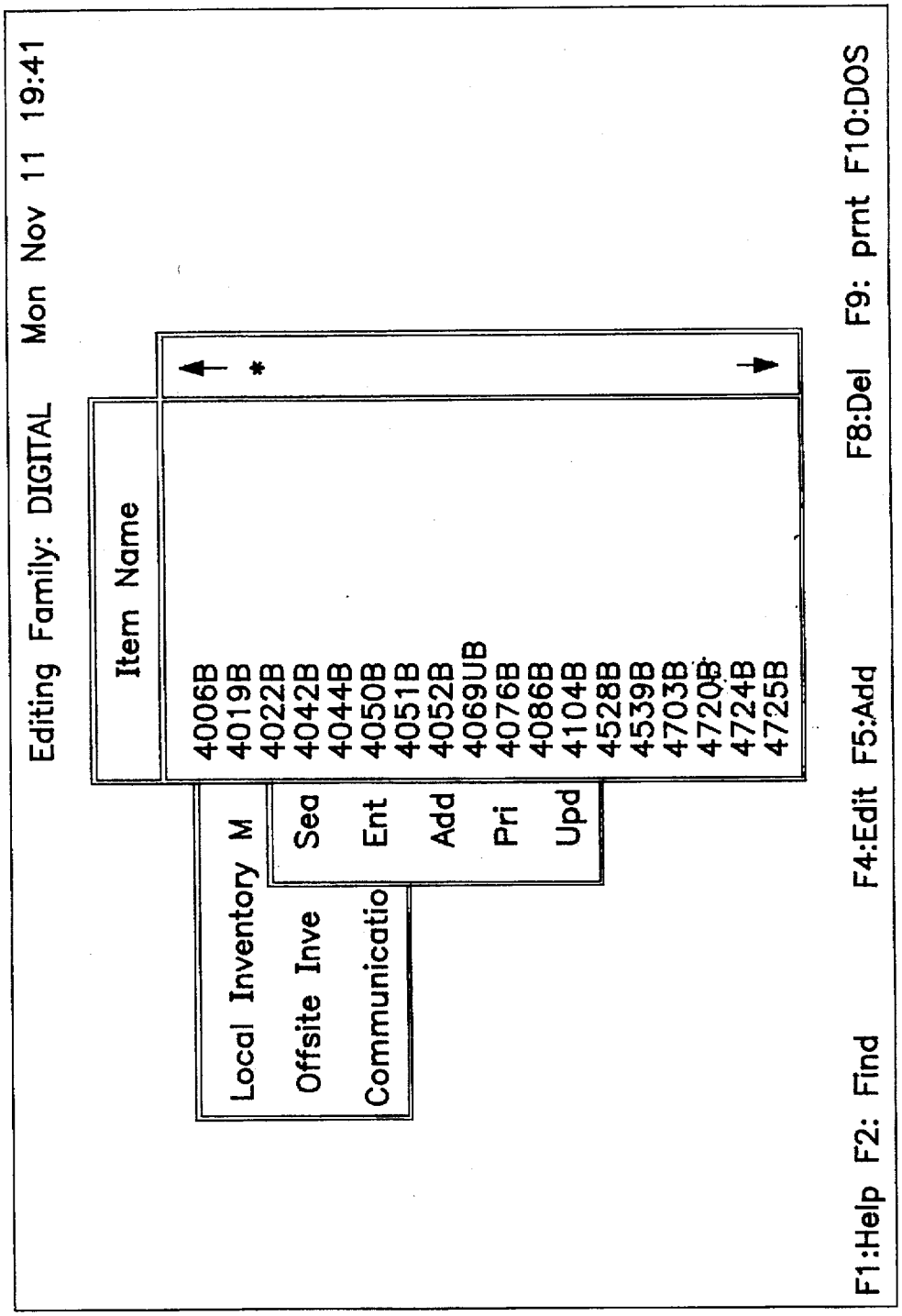
FIG. 9 is a display of an item menu for a particular family/subfamily.

If the user selects the enter/edit entry on the local inventory menu shown in FIG. 5, step 404 causes the local edit routine to be called by step 405. The system then displays a menu of all family/subfamily names in the local inventory database, i.e., as shown in FIG. 8. The user then selects a family/subfamily needing editing from the menu by moving the cursor to the family/subfamily to be selected and pressing the enter key. When the enter key is pressed the user will be asked to enter an item name from the menu shown in FIG. 9. The user then can select one of the listed item names which causes an item form for the selected item name to be displayed on display 5. An example of an item form is shown in FIG. 10.

The item form shown in FIG. 10 contains information such as family, item name, date code, manufacturer name, cost of item and quantity available. In addition, the user may enter any comments regarding the particular item. The information contained in the local item form is then used by the system as the information available to other offsite users who have interest in this family/subfamily. This is the information that will appear in the other user's offsite inventory.

This will be further described in the offsite inventory section.

Figure 11:
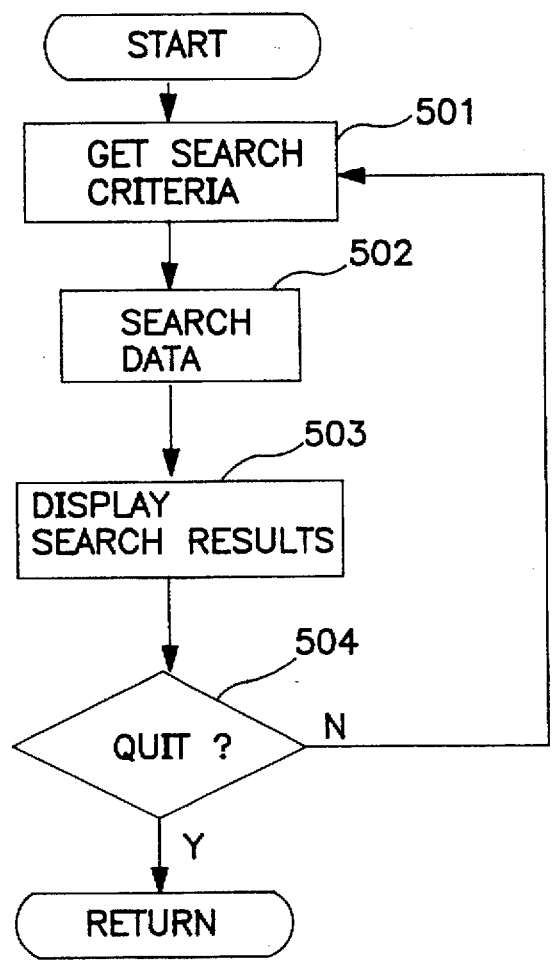
FIG. 11 is a flowchart of the search routine.

Another entry that can be selected from the local inventory menu in FIG. 5 is the search entry. If selected, step 402 will cause step 403 to prompt the user to enter a family/subfamily name from the family/subfamily names in the local inventory database, using the menu shown in FIG. 8. After selecting the family/subfamily to be searched, the search routine shown in FIG. 11 is called by step 403. The search routine provides the user with the capability of searching the local inventory database for specific desired items. A similar search procedure is used for offsite inventory searching.

During the search routine the system prompts the user, in step 501, to enter a search criteria which is entered onto the form shown in FIG. 12. The search criteria includes item name, manufacturer name, minimum quantity, minimum date code and maximum cost. Search criteria may be edited or left in the default, if left in the default all items in the selected family/subfamily will be displayed. If edited, only those items meeting the edited search criteria will be displayed. Once the search criteria is selected the F6:search key initiates the search procedure as shown in step 502. F4:edit allows for editing search parameters through the use of a wildcard (*) as an example; if an item with a "16" in it is needed the item entry would read *16*. Any item with a 16 in it would then be selected. Wildcarding can also be used for manufacturer selection. Editing is also used to determine acceptable minimum quantities, minimum date codes and maximum costs.

The results of the search are then displayed in step 503 on display 5 as shown in FIG. 13. The parameter information being listed on the x-axis, including item name, quantity, date code, manufacturer name, cost and family. For example, in FIG. 13, chip name "4002B" is found in the local inventory to have a quantity "20001", a date code "9000", manufacturer "GOLD" and a cost of "0.06" cents.

The user by moving the cursor up and down using keyboard 4 can select items of interest, if the enter key is then selected the comment section for the item will be displayed. When the user is finished reviewing the list of information, the escape key is pressed which returns the system to the search criteria form so to edit the form and perform another search. Otherwise step 504 returns flow to the calling routine, the local inventory menu in this case. The search procedure is also used when a local user is searching his many stored offsite inventory databases.

Another entry that can be selected from the local inventory menu, shown in FIG. 5, is the update entry. If this entry is selected, step 410 causes the update routine to be called by step 411. The system then displays a menu of all family/subfamily names in the local database as shown in FIG. 8, so that the user can select the desired family/subfamily to be updated. After selecting the desired family/subfamily, the system displays a list of item records like that shown in FIG. 14 from which the user can select a specific item record to be updated. The user is then prompted to enter a new quantity and/or a new price for the item selected. When updating is complete the user presses the escape key which returns the system to the local inventory menu. This allows for rapid maintenance of inventory integrity.

Another entry on the local inventory menu is print. If print is selected, step 408 causes the local print routine to be called by step 409. Again, the user selects the family/subfamily desired and the system begins to print the local inventory information for the selected family/subfamily on printer 9.

It is not necessary to have any local inventory in order to be a user of this system. As in the case with users who are only interested in obtaining items not offering items for sale.

If the escape key is entered at keyboard 4 the local inventory menu is exited at step 412 and program flow passes back to the main routine.

Figure 15:
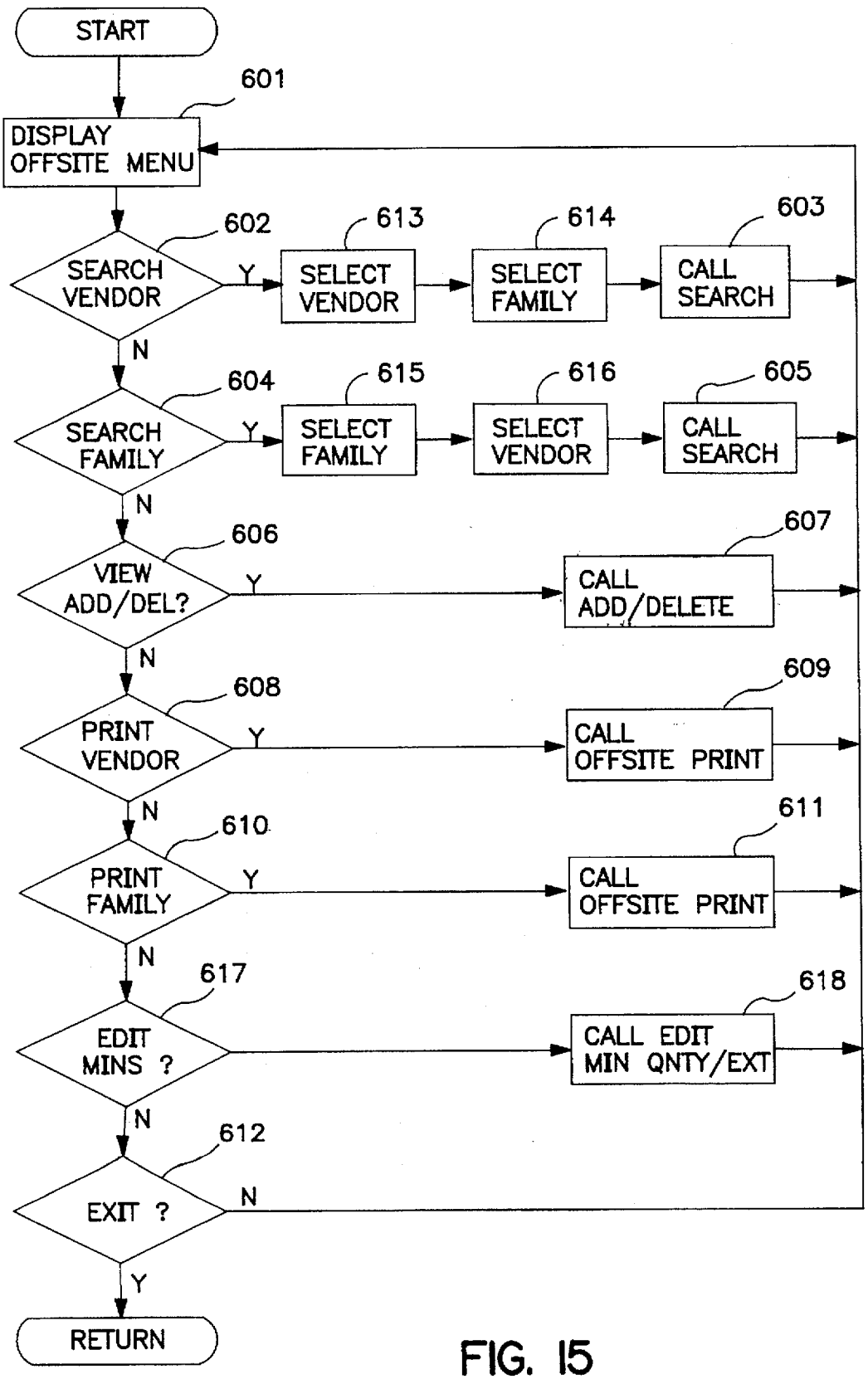
FIG. 15 is a flowchart of the offsite menu routine.
Figure 16:
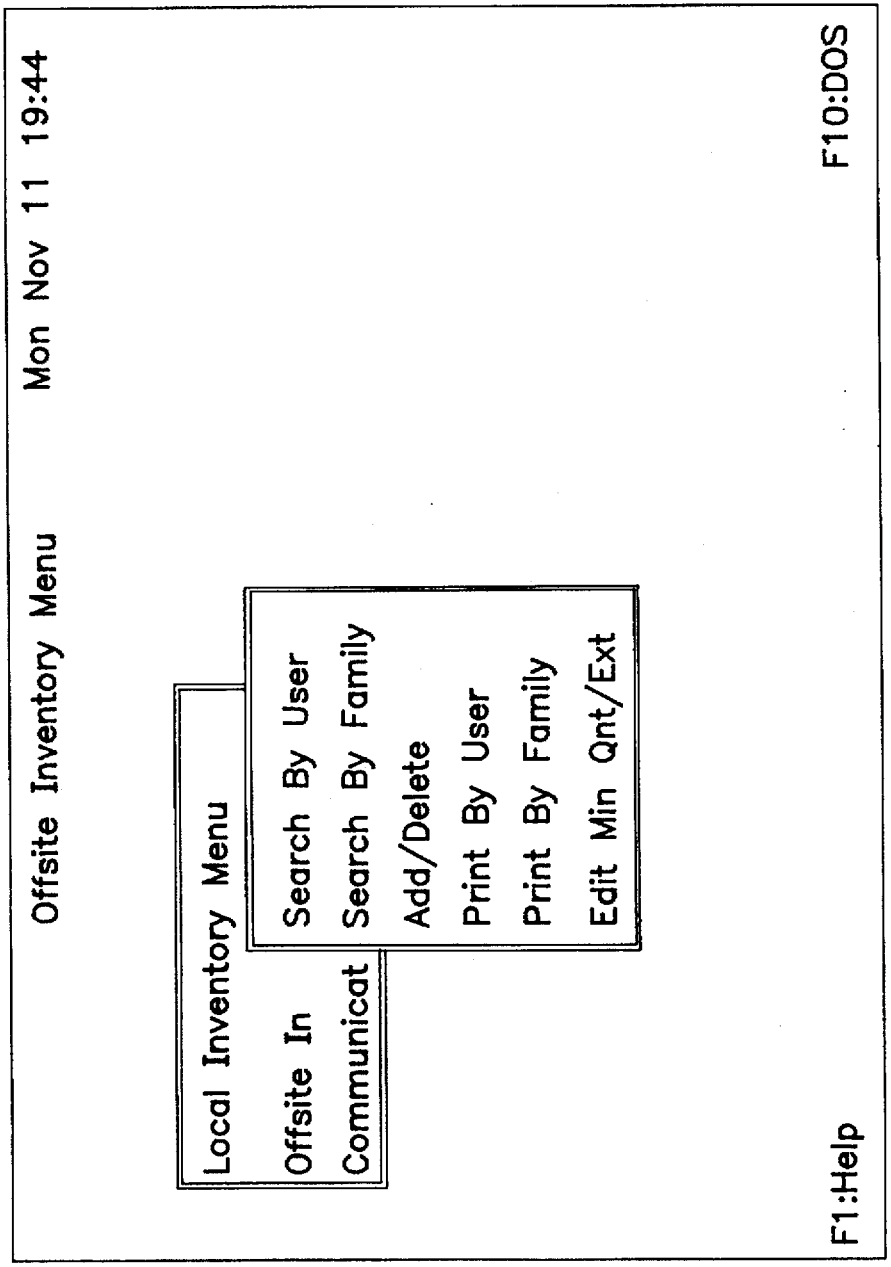
FIG. 16 is a display of an offsite inventory menu.

Another subsystem of the present invention that can be selected from the main menu in FIG. 3 is the offsite inventory menu. If this entry is selected, step 15 in FIG. 2 causes step 16 to call the offsite menu routine. A flow chart of the offsite menu routine is shown in FIG. 15. Step 601 in this routine displays an offsite inventory menu as shown in FIG. 16, which includes a search by vendor, Search by family, offsite add/delete, print by vendor, print by family and edit minimum quantity/extension selections.

When the search by vendor entry is selected from the offsite inventory menu at step 602, step 613 prompts the user to select any vendors from a list of vendors provided by the system, by moving the cursor to the desired vendor's name or by using the "f" keys and then pressing the enter key on keyboard 4. Step 614 then requests the user to select any family/subfamilies to be searched for, the selection is made as with the vendors as explained above by using the "f" keys. The search criteria routine is then called in step 603. The search routine shown in FIG. 11 and described above performs the search and when completed the search results are displayed in step 504 categorized by vendor. The offsite search criteria functions in the same way as discussed in the local inventory section.

If the search by family entry is selected from the offsite menu routine at step 604, step 615 requests the user to select a family/subfamily to be searched and step 616 requests specific vendor names to be searched. Step 605 then calls the search routine, performs the search and displays the search results categorized by family. The difference between the search by vendor and search by family search results is displayed in FIGS. 17A and 17B.

If the offsite add/delete entry is selected, step 606 causes the add/delete routine to be executed by step 607. The offsite add/delete routine is the same as that described in the local inventory add/delete routine discussed above except that the local inventory add/delete selects those families/subfamilies pertinent to the local user's inventory, while the offsite inventory add/delete selects those families/subfamilies that the local user is interested in receiving from the many offsite databases that have been selected from the network. The family/subfamily selected for the local inventories and for the offsite inventories have no correlation to each other with the exception that selection is made from the same master list (see FIG. 6). It is not necessary to have offsite inventory requirements as in the case where the user only wants to offer items for sale.

The print by vendor entry and the print by family entry are selected by step 608 and step 610, respectively, and cause the offsite print routine to be called by step 609 and step 611, respectively. The offsite print routine is similar to the local print routine and permits the user to print all the offsite inventories arranged by vendor or family, respectively.

Figure 18:
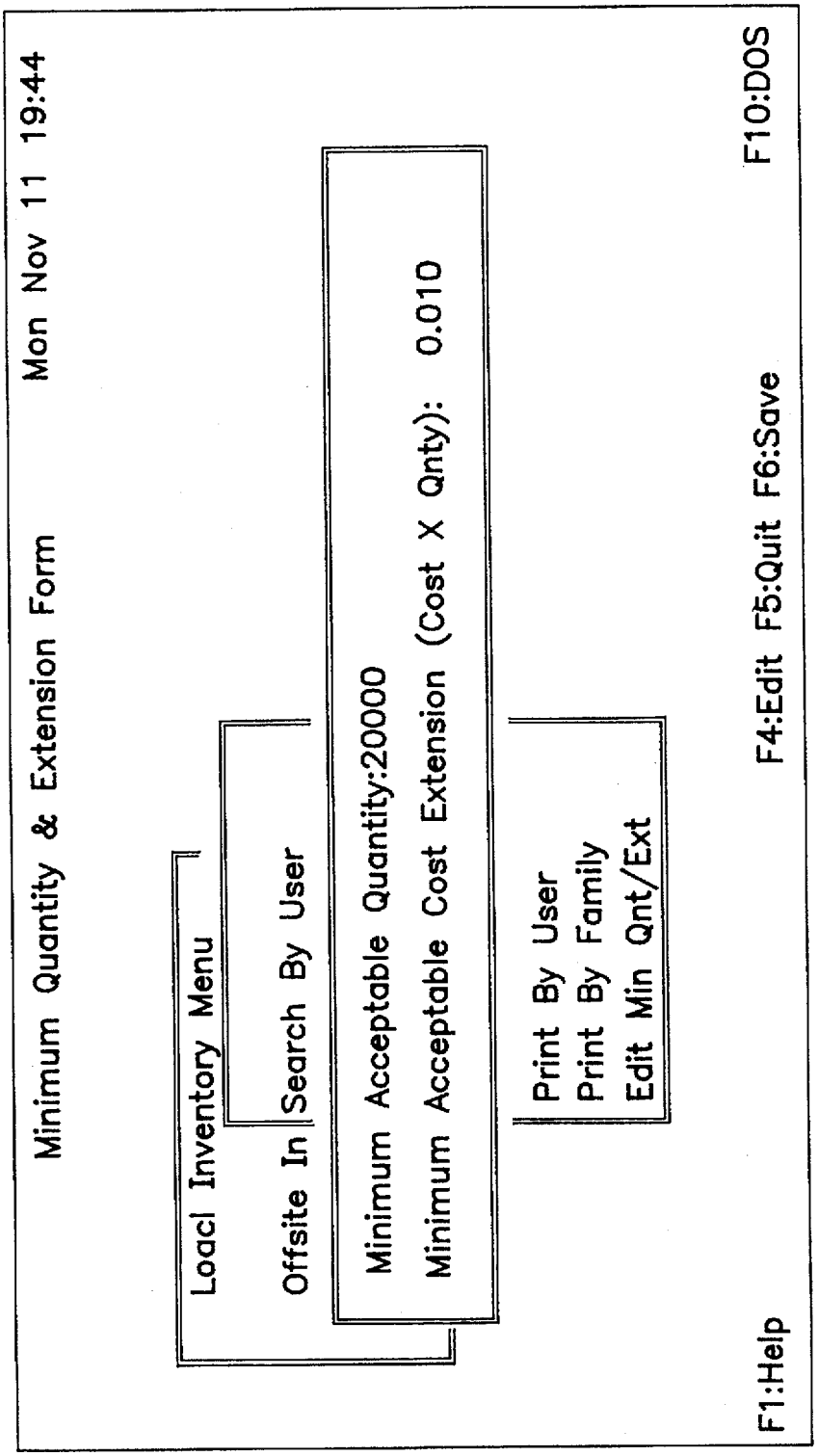
FIG. 18 is a display of the minimum quantity and minimum cost extension form.

The edit minimum/extension entry selected at step 617 calls the edit minimum quantity/extension routine in step 618 which prompts the user to enter the minimum quantity and cost extension which will be accepted by the local computer from the many offsite network members. This form is displayed in FIG. 18, and permits the local user to filter out superfluous offsite inventory items because of small quantities and/or cost extensions. If the received cost is zero then the system ignores the cost extension and only the quantity is filtered.

If the escape key is entered at the offsite inventory menu it is exited at step 612 and program flow passes back to the main routine.

Figure 19:
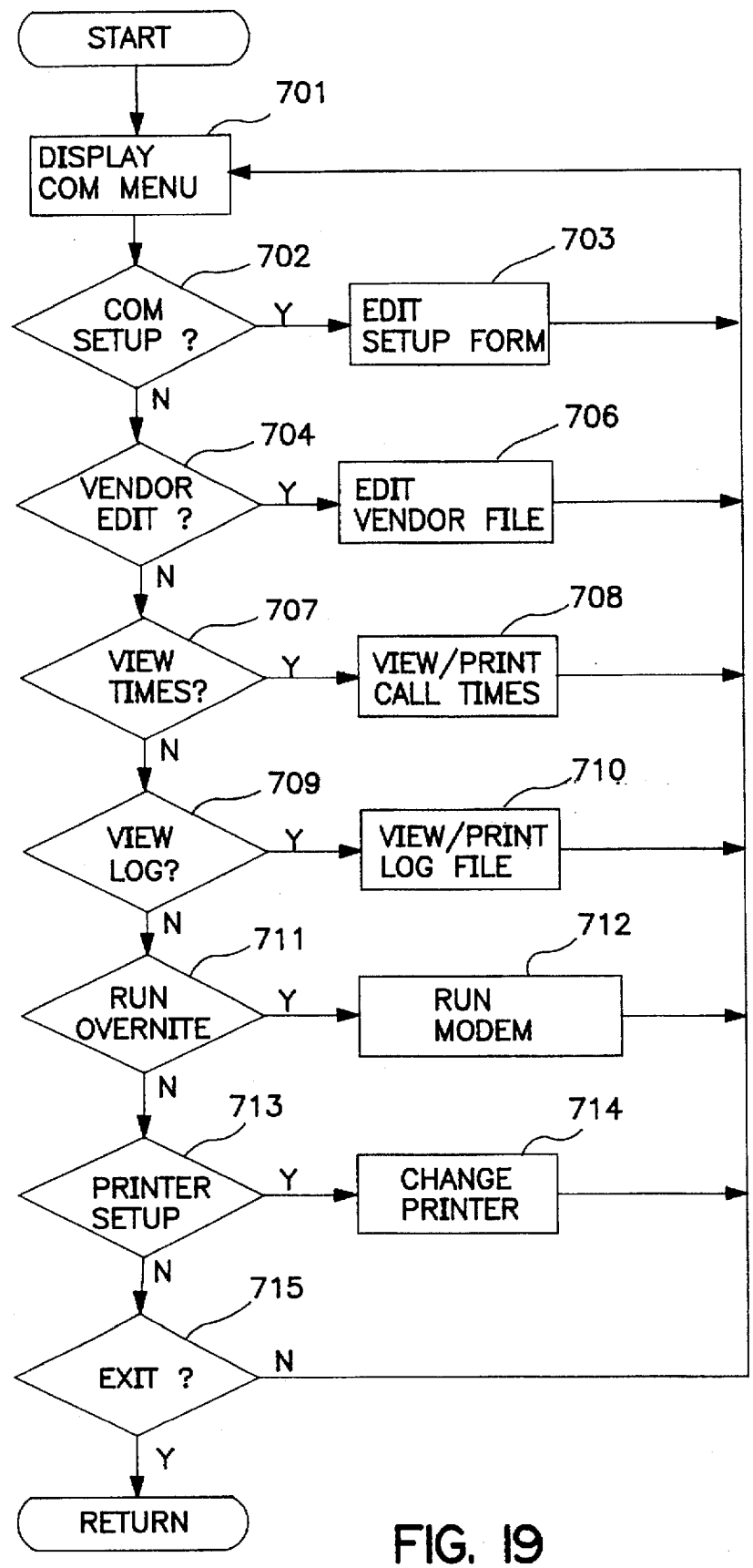
FIG. 19 is a flowchart of the communication menu routine.
Figure 20:
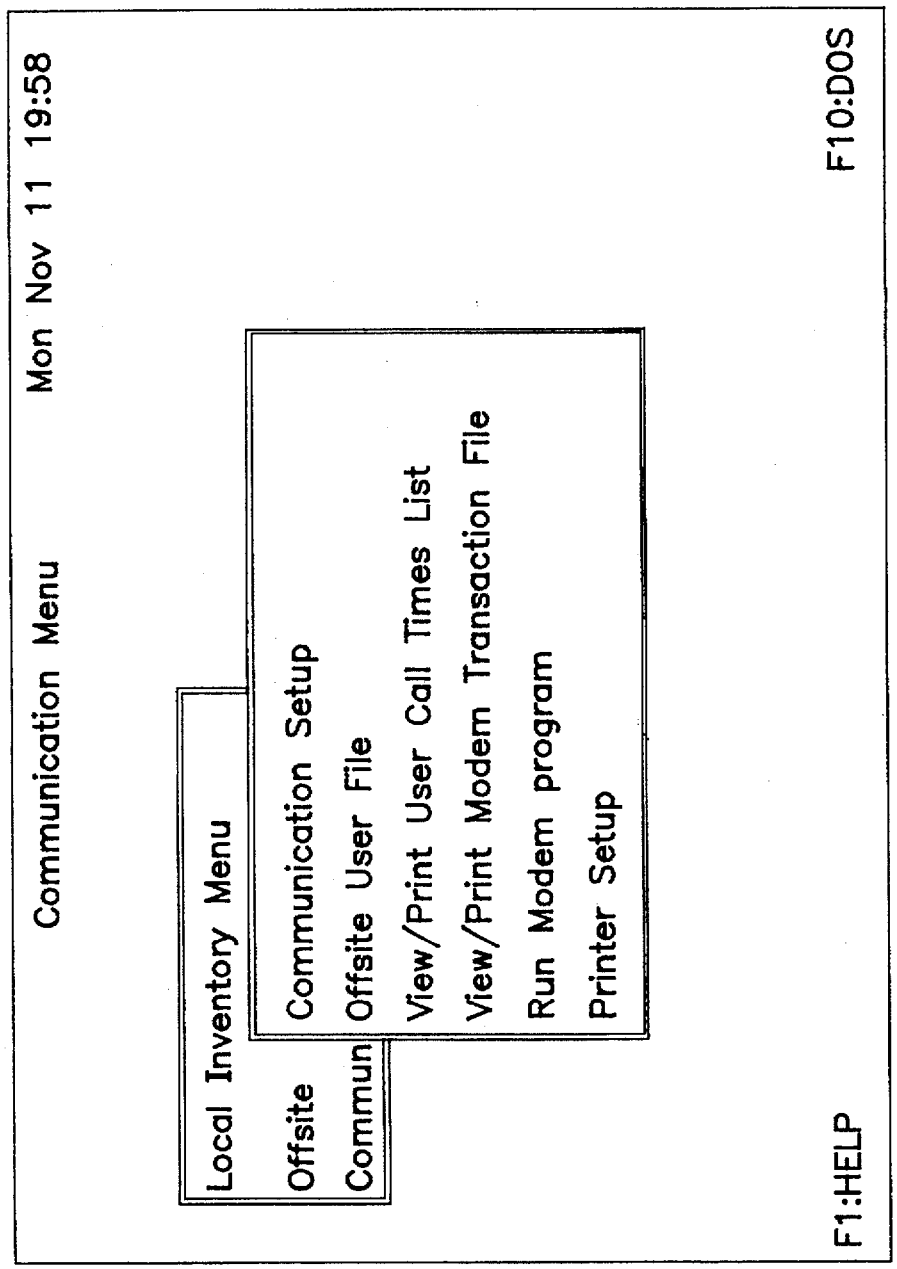
FIG. 20 is a display showing the communication menu.

The last subsystem that can be selected from the main menu in FIG. 3 is the communication menu. When the communication menu is selected, step 17 causes the communication menu routine to be called by step 18. A flow chart of the communication menu routine is shown in FIG. 19. In step 701, a communication menu like that shown in FIG. 20 is displayed on display 5 including modem setup, offsite user file, view/print user call times list, view/print modem transaction file, run modem program and printer setup entries.

Figure 21:
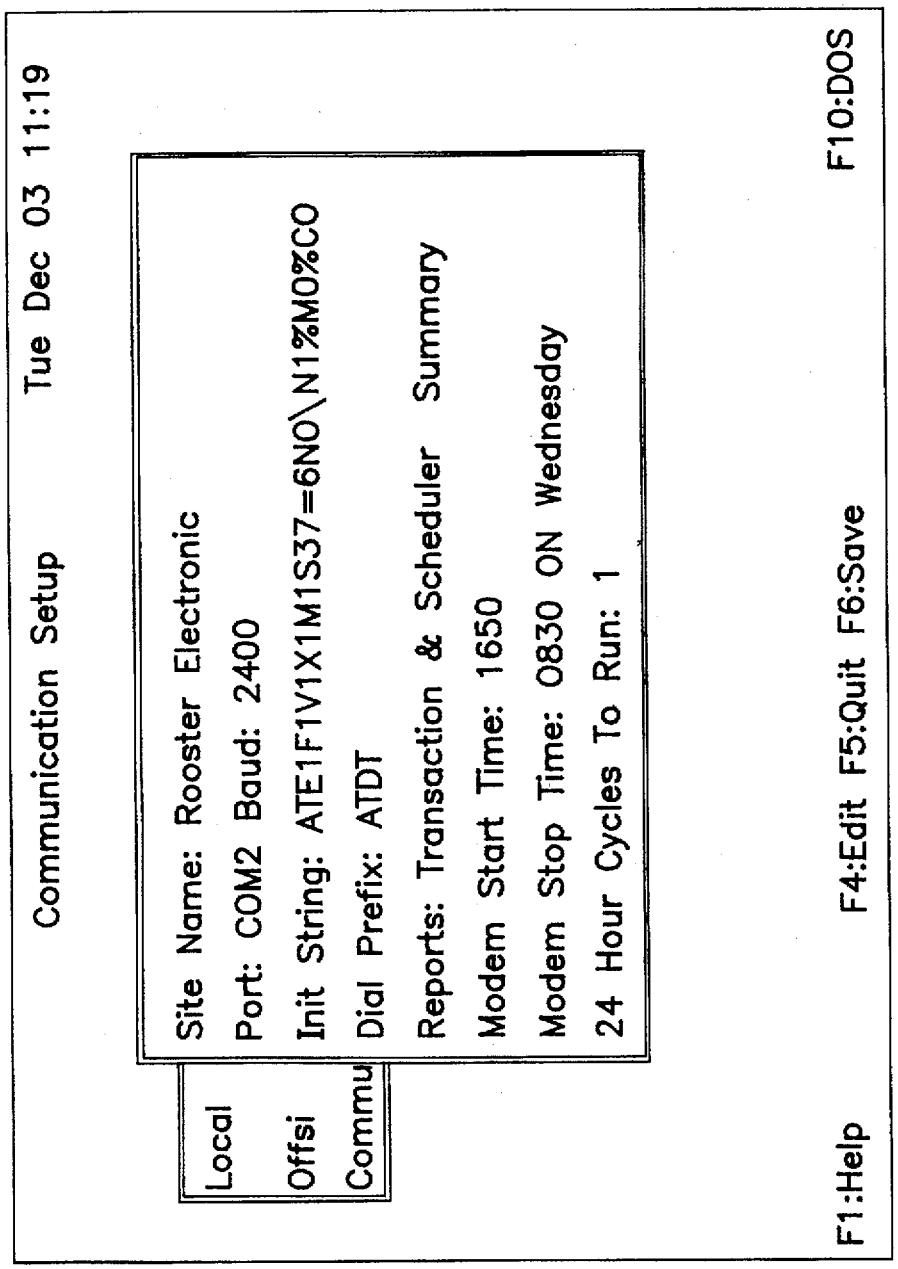
FIG. 21 is a display showing the communication setup form.

If the modem setup entry is selected, step 703 causes the setup form, as shown in FIG. 21, to be displayed. This permits the user to interface the modem to the system by specifying parameters, i.e., Site name, Baud rate, com-port, init string and dial prefix. Levels of reporting are also selected on the setup form. Four selections are available: 1) no reports; 2) transaction reports; 3) scheduler reports; and 4) transaction and scheduler reports. Level selection is accomplished by placing the cursor over the reports list and using the space bar to toggle through the options.

Modem operation start time may be programmed to occur any time in the next 24 hour period while modem operation stop times may be programmed to occur any time in the next 7 days thus accommodating weekends or holidays. The advantage of the auto stop is that auto stop initiates the integration of all received data into the offsite inventory and returns the system to the state it was in prior to the auto start time. After this occurs, there is a prompt on the screen asking if log review is desired.

If the offsite user file entry is selected in step 704 the user is requested to select a vendor at step 705 and in step 706 a vendor form is displayed like that shown in FIG. 22 which permits the local user to add an offsite user or to edit the information pertaining to the selected offsite user. The vendor form includes information pertaining to the selected user such as the user's name, address, phone number, fax number, the name of a person who can be contacted at the user's location and the offsite computer phone number of the user's modem. This user information is then available on the offsite inventory search result form when a desired item is shown on that form. This user form is filled out in order to send modem calls and also to receive modem calls, thus allowing selection of users who have access to the local inventory.

Also located on the user form is the format for scheduling modem calls. This is accomplished by inserting the time for the modem to call at the desired day of the week. When the system is in the run modem program the system will automatically make the modem calls at the appointed time, but the system will not complete a call if it has already received a call from that specific user during that specific run modem period since data has already been transmitted. "0000" is reserved for dead time and no calls can be made at that time. Call times can conveniently be changed by overwriting with a new time. A review of a full week's schedule is available by selecting the view/print users call times list on the communication menu; an example of this list is provided in FIG. 23.

Each of the entries on the user form, shown in FIG. 22, can be edited by moving the cursor to the entry to be changed and typing in new or modified information using keyboard 4. When the user is satisfied with the information entered in the user form, the escape key on keyboard 4 is depressed to exit and save the user form.

The system will only allow communication with a network member if that member's information has been entered in the offsite users file—this allows each site to determine with whom it will communicate.

If the view/print modem transaction file entry is selected from the communications menu at step 707, the system displays on display 5 the level of reporting as selected on the setup menu. This data may then be viewed on the screen and sent to the printer for hard copy. An example of a transaction file is shown in FIG. 24.

The run modem program entry detected at step 711 causes a modem routine to be executed at step 712 which places the system into a modem communication mode as displayed in FIG. 25. The communication mode calls the selected offsite locations at the selected time/day as specified in the offsite user form discussed above. The system must be in the run modem mode to receive/send calls from/to the offsite locations. It is expected that the run modem mode will be used from 6:00 p.m. to 5:00 a.m. local time which will allow for U.S., South American, and European time variations. Far Eastern time variations can be allowed for on weekend operations or by extending the run modem time.

Run modem program can be selected manually from the communication menu or automatically from the times programmed in the modem setup mode. An advantage in using the auto stop time is that the integration of the received offsite inventory data will commence with auto stop thus saving time from the work day. It is also possible to force a modem call by selection F1:call when you are in the run modem program.

The last entry on the communication menu is the printer setup entry which, using steps 713 and 714, permits the user to specify the printer being used by the system and any necessary parameters for the specified printer.

If the escape key is entered at the keyboard the communications menu is exited at step 715 and program flow passes back to the main routine.

In addition to the inventory program, shown in FIG. 2, another program is used to manage the overall network. The network manager program permits a network manager to edit the family/subfamily master list which is used by all users when selecting local and offsite inventory databases. This program also keeps track of network members.

The system has been implemented to manage the availability of electronic components. In this application, information regarding each component includes family/subfamily, item name, date code, manufacturer, cost, quantity on hand, comments and vendor information. The use of the family/subfamily item allows for three levels of product definition and this system can be used for any product defined by multiple levels of definition and is not limited only to electronic components.

Another feature of the present invention provides for two-way communications between the local system and offsite systems so that each site will have its offsite inventory updated with each call effectively cutting communications in half.

What is claimed is:

1. A method of exchanging information of electronic components among different vendors each having a vendor controlled data base through a communication network, said method comprising the steps of:

storing a universal set of categories of the electronic components at each of a plurality of vendor sites;

storing at each vendor site a local inventory of electronic components of at least one category of the universal set of categories in the vendor controlled data base and data identifying other vendor sites permitted to access the vendor controlled data base of the vendor site;

selecting, at each vendor site, at least one category of the inventory of electronic components independently controlled data base of other of the selected from the universal set of categories as available to other vendors automatically interconnecting vendor site data bases identified as permitted to access each other's vendor controlled data base at scheduled times to exchange information on electronic components of the at least one selected category available to other vendors through the communication network;

transmitting information regarding the electronic components of the selected at least one category available to other vendors directly from the vendor controlled data base of each automatically interconnected vendor site to each other automatically interconnected vendor site through the communication network;

receiving information regarding electronic components of the selected at least one category available to other vendors at each automatically interconnected vendor site directly from each of the other automatically interconnected vendor controlled data bases in searchable offsite data bases assigned to the other automatically interconnected vendor sites through the communication network.

2. A method according to claim 1, wherein the information received in response to the request for information regarding electronic components of the selected at least one category includes formatted data of the electronic components from the other selected vendor sites, and further comprising the step of entering the formatted data into the off-site data base of the selected vendor site receiving the information.

3. A method according to claim 2, wherein the formatted data of electronic components includes a family/subfamily name and an electronic component name.

4. A method according to claim 2, wherein the formatted data includes for each electronic component in each category an electronic component name, an electronic component quantity, a manufacturer name, a date of manufacture, a price of electronic component and a comment section to describe any non-standard parameters.

5. A method according to claim 1, further comprising the step of preselecting acceptable electronic component quantities and costs to form the request for information regarding electronic components of the selected at least one category to be sent to the other selected vendor sites.

6. A method according to claim 1, wherein only updated information is received from the other selected vendor site databases.

7. A method according to claim 1, further comprising the step of printing a transaction report for all transactions indicating the time and date and the other selected vendor databases.

8. A method according to claim 1, further comprising the steps of:

entering search criteria including an electronic component name, a quantity, a manufacture name, a date code and a price; and searching the offsite database for information matching the entered criteria.

9. A method according to claim 1, wherein the step of selecting the at least one category comprises the step of specifying a family/subfamily category.

10. An apparatus for exchanging information on electronic components among different vendors each having a vendor controlled data base at a site of the vendor via a communication network, comprising:

means for storing a universal set of categories at each of a plurality of vendor sites;

means for storing at each of the plurality of vendor sites a local inventory of electronic components of at least one category of the universal set of categories in the vendor controlled data base of the vendor and data identifying other vendors with permission to access to the vendor site;

means at each vendor site for selecting at least one category of the inventory of electronic components in the vendor controlled data base from the universal set of categories as available to other vendors;

means for automatically interconnecting vendor site data bases having permission to access each other's vendor controlled data base at scheduled times to exchange information on electronic components of the at least one selected category available to other vendors through the communication network;

means for transmitting information regarding the electronic components of the selected at least one category available to other vendors directly from each automatically interconnected vendor site to the other automatically interconnected vendor sites through the communication network; and means at each automatically interconnected vendor site for receiving information regarding electronic components available to other vendors directly from the vendor controlled data bases of the other automatically interconnected vendor sites in searchable offsite data bases assigned to the other automatically interconnected vendors through the communication network.

11. A method of exchanging information on electronic components among vendors each having vendor controlled data base at a vendor site, said method comprising the steps of:

storing a universal set of categories at each vendor site;

storing at each vendor site a local inventory of electronic components of at least one category of the universal set of categories in the vendor controlled data base of the vendor site and data identifying other vendor sites given permission to access to the vendor site;

selecting at each vendor site at least one category of the inventory of electronic components in the local inventory of the vendor controlled data base of the vendor site as available to other vendors; and automatically interconnecting first and second vendor sites identified as having permission to access each other's vendor controlled data bases at prescheduled times for exchanging information between the first and second vendor sites regarding the electronic components of the at least one category available to other vendors in the local inventory of the vendor controlled data bases at the first and second vendor sites through a communication network;

transmitting information directly from the first vendor site to the second vendor site regarding the electronic components of the selected at least one category at the first vendor site available to other vendors through the communication network;

receiving information at the first vendor site regarding the electronic components of the selected at least one category available to other vendors from the second vendor site directly from the local inventory of the vendor controlled data base of the second vendor site in a searchable offsite data base of the first vendor site through the communication network;

transmitting information directly from the second vendor site to the first vendor site regarding the electronic components of the selected at least one category available to other vendors from the second vendor site through the communication network; and receiving information at the second vendor site regarding the electronic components of the selected at least one category available to other vendors from the first vendor site directly from the vendor controlled inventory data base of the first vendor site in a searchable offsite data base assigned to the first vendor site through the communication network.

12. A method according to claim 11, wherein the information received at the first and second vendor sites in response to the request for information regarding the selected at least one category from the other of the first and second sites includes formatted local inventory data from the other of the first and second sites, and further comprising the step of entering the formatted local inventory data from the first vendor site into the offsite data base of the second vendor site; and the step of entering the formatted local inventory data from the second vendor site into the offsite data base of the first vendor site.

13. A method according to claim 11, further comprising the step of preselecting acceptable electronic component quantities and costs to form each request for information regarding the selected at least one category to be transmitted.

14. A method according to claim 11, wherein only updated information is transmitted to and received from the first and second sites.

15. A method according to claim 11, wherein the step of selecting the at least one category comprises the step of specifying a family/subfamily category.

16. Apparatus for exchanging information on electronic components among a plurality of vendors each having a vendor controlled data base at a vendor site, comprising:

means for storing a universal set of categories at each of the plurality of vendor sites;

means for storing at each vendor site a local inventory of electronic components of at least one category of the universal set of categories in the vendor controlled data base and data identifying other vendor sites given to access to the vendor site;

means at each vendor site for selecting at least one category of the inventory of electronic components in the local inventory of the vendor site as available to other vendors;

means for automatically interconnecting first and second vendor site data bases identified as having permission to access each other's vendor controlled data base at prescheduled times for exchanging information between the first and second vendor sites regarding the electronic components of the at least one category available to other vendors in the local inventory of the vendor controlled data bases at the first and second vendor sites through a communication network;

means at each of the automatically interconnected first and second vendor sites for transmitting directly to the other of the first and second vendor sites information regarding the electronic components of the selected at least one category available to other vendors through the communication network;

means at each of the automatically interconnected first and second vendor sites for receiving information directly from the independently controlled data base of the other of the automatically interconnected first and second vendor sites in a searchable offsite data base assigned to the other of the first and second vendor sites through the communication network.

17. A method according to claim 1, wherein the electronic components include at least one of digital components, linear components, memory components, interface components and optical components.

18. Apparatus according to claim 10, wherein the electronic components include at least one of digital components, linear components, memory components, interface components and optical components.

* * * * *